United States Patent [19]

Brammer et al.

[11] Patent Number: 4,823,878

[45] Date of Patent: * Apr. 25, 1989

[54] GUIDELINELESS REENTRY SYSTEM WITH FIXED ROLLERS

[75] Inventors: Norman Brammer, Scotland, Scotland; Charles E. Jennings, Houston, Tex.

[73] Assignee: Vetco Gray Inc., Houston, Tex.

[*] Notice: The portion of the term of this patent subsequent to Apr. 25, 2006 has been disclaimed.

[21] Appl. No.: 106,838

[22] Filed: Oct. 8, 1987

[51] Int. Cl.$^4$ .............................. E21B 43/013
[52] U.S. Cl. .................... 166/341; 166/345; 166/359; 285/24
[58] Field of Search ............ 166/341, 345, 342, 343, 166/349, 339, 359; 285/24, 27; 405/169

[56] References Cited

U.S. PATENT DOCUMENTS

| | | | |
|---|---|---|---|
| 3,500,906 | 3/1970 | Peterson | 166/341 |
| 3,517,738 | 6/1970 | Petersen | 166/349 |
| 3,675,713 | 7/1972 | Watkins | 285/18 X |
| 3,688,840 | 9/1972 | Curington et al. | 166/341 |
| 4,167,215 | 9/1979 | Thorne | 166/341 |
| 4,171,922 | 10/1979 | Coulboy et al. | 166/341 X |
| 4,375,835 | 3/1983 | Archer | 166/349 X |
| 4,399,872 | 8/1983 | McConaughy et al. | 166/341 |
| 4,609,046 | 9/1986 | Schawann et al. | 166/341 |
| 4,662,785 | 5/1987 | Gibb et al. | 405/195 |
| 4,754,813 | 7/1988 | Jennings et al. | 166/344 |

OTHER PUBLICATIONS

Drawing-Technip Geoproduction Swims.
Vecto Gray Catalog, 1986-1987.

Primary Examiner—Hoang C. Dang
Attorney, Agent, or Firm—James E. Bradley

[57] ABSTRACT

A guidelineless reentry system for a subsea well uses a downward facing funnel. The well has a mandrel surrounded by a guide frame. A guide ring is mounted to the guide frame. A funnel and a mandrel connector are carried by the riser. Rollers mounted to the funnel engage the guide ring to allow the mandrel connector and funnel to be rotated to orient the mandrel connector. Once the orientation is achieved, the mandrel connector is lowered relative to the funnel into engagement with the mandrel. A cam moves dogs outward to engage grooves of the mandrel. The mandrel protrudes upward from the guide ring.

4 Claims, 4 Drawing Sheets

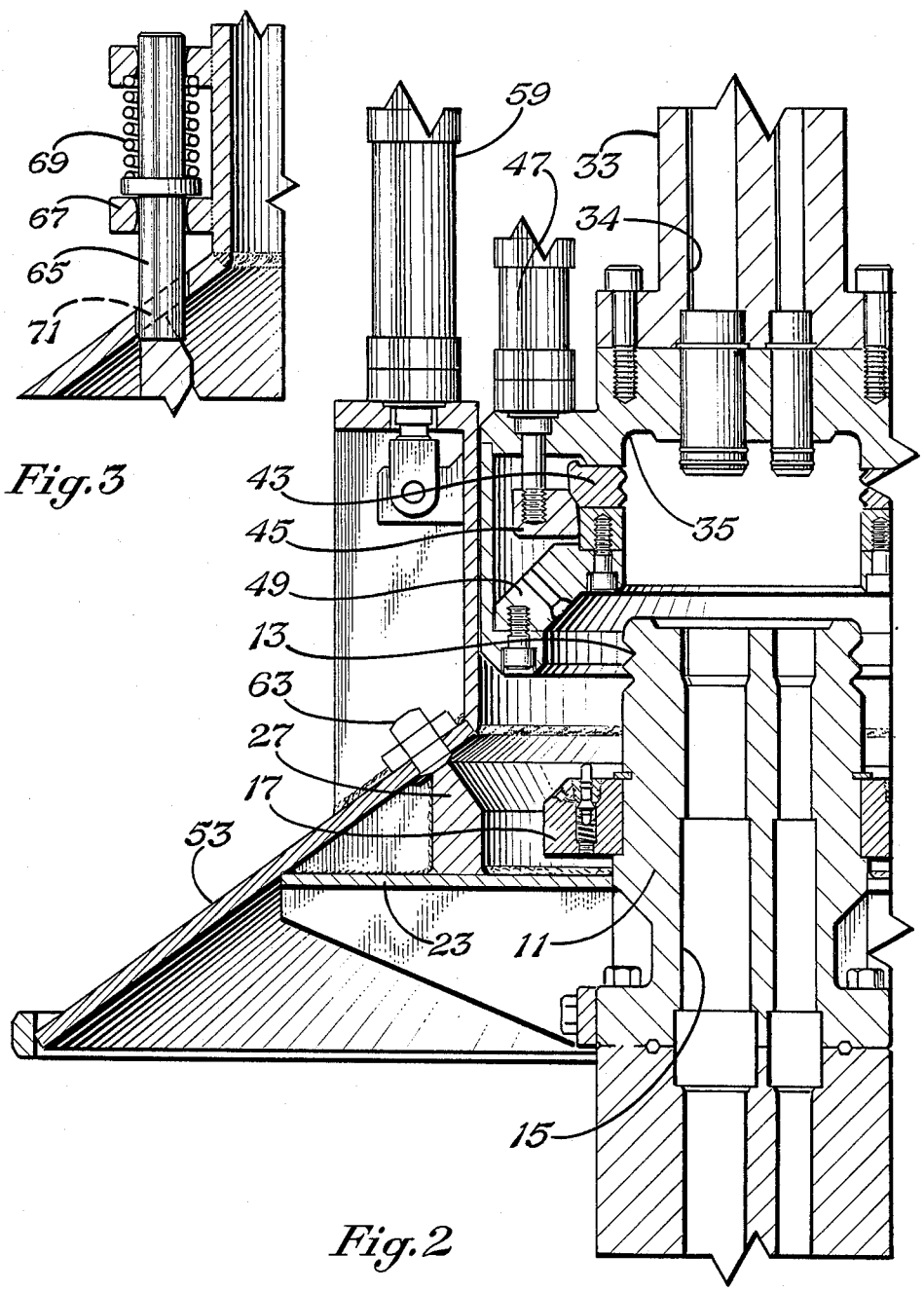

GUIDELINELESS REENTRY SYSTEM WITH FIXED ROLLERS

CROSS-REFERENCE TO RELATED APPLICATIONS

This application is being filed simultaneously with another application by the same inventors, entitled "Guidelineless Reentry System With Nonrotating Funnel" Ser. No 106,837 filed Oct. 8, 1987. The same inventors have also filed a related application entitled "Guidelineless Reentry System With Retracting Rollers" Ser. No. 099,360, filed Sept. 21, 1987.

BACKGROUND OF THE INVENTION

1. Field of the Invention

This invention relates in general to subsea wells, and in particular to a system for reconnecting a riser from a floating vessel to a subsea well for workover operations.

2. Description of the Prior Art

In deep water offshore oil and gas wells, the Christmas tree of the well will often be located on the subsea floor. At times, a workover operation must be performed on the subsea well. When this is required, a floating vessel is positioned over the well. A string of riser pipe is lowered down into engagement with a mandrel on the subsea tree. Once in engagement, operations can be performed on the well.

If the system is a guidelineless system, there will be no guidelines extending upward from the subsea well structure to the surface. Generally, in a guidelineless system, a large upward facing funnel is mounted permanently on the subsea tree. The funnel, with the aid of television cameras, assists in guiding the lower end of the riser onto the mandrel of the subsea well. The funnel can be quite large, up to twelve feet in diameter. A funnel of this type is expensive to construct and is only used when a workover operation is performed.

Mounting a downward facing funnel on the riser would avoid the need for a permanent upward facing funnel on each well. However, a funnel rigidly mounted to the lower end of the riser would require an extra high mandrel extending above the control mechanisms on the tree, so as to insure that the funnel did not strike any of various control mechanisms on the side of the tree. Hydraulic connections must also be made up when the riser lands on a mandrel to connect the control of the tree to the floating platform. Orienting the funnel onto the mandrel of the Christmas tree without damage to the hydraulic manifold or valve block would be a problem.

There have been proposals to make the funnel retractable. The funnel would be located on the lower end of the riser, but would be vertically movable relative to the lower end of the riser by means of hydraulic rams. The funnel is lowered in an extended position. Once proper orientation has been made, the funnel would be retracted. During retraction, the riser and mandrel connector lower down into engagement with the mandrel. While these proposals have merit, improvements are desirable.

SUMMARY OF THE INVENTION

In this invention, a guide frame is mounted to the mandrel below the top of the mandrel. A guide ring is mounted to the guide frame and encircles the mandrel. A mandrel connector is mounted to the lower end of the riser. The mandrel connector includes dogs which move radially in to lock the mandrel connector to the mandrel.

A guide funnel is carried by the riser for insertion over the mandrel. The guide funnel will move from a lower extended position to an upper position. Once the funnel has landed and the proper orientation has been achieved, the mandrel connector is lowered along with the riser onto the mandrel by retracting the funnel. The dogs are then moved into engagement with the mandrel by means of the cam.

The guide ring is mounted on the guide frame so that a straight line can be drawn between the tops of the mandrel, guide ring and periphery of the guide frame. A hydraulic manifold encircles the mandrel within the guide ring. The hydraulic manifold has a plurality of passages leading to equipment on the subsea well. A manifold connector is carried by the mandrel connector. The manifold connector is connected to lines that lead to the surface for supplying hydraulic fluid. When the mandrel connector is connected to the mandrel, the manifold connector will seat against the hydraulic manifold.

BRIEF DESCRIPTION OF THE DRAWING

FIG. 2 is a partial sectional view of the system of FIG. 1, with the funnel engaging the guide ring and in an extended position.

FIG. 3 is a partial vertical sectional view of a locking pin of the system of FIG. 1.

DESCRIPTION OF THE PREFERRED EMBODIMENT

Figure 1:
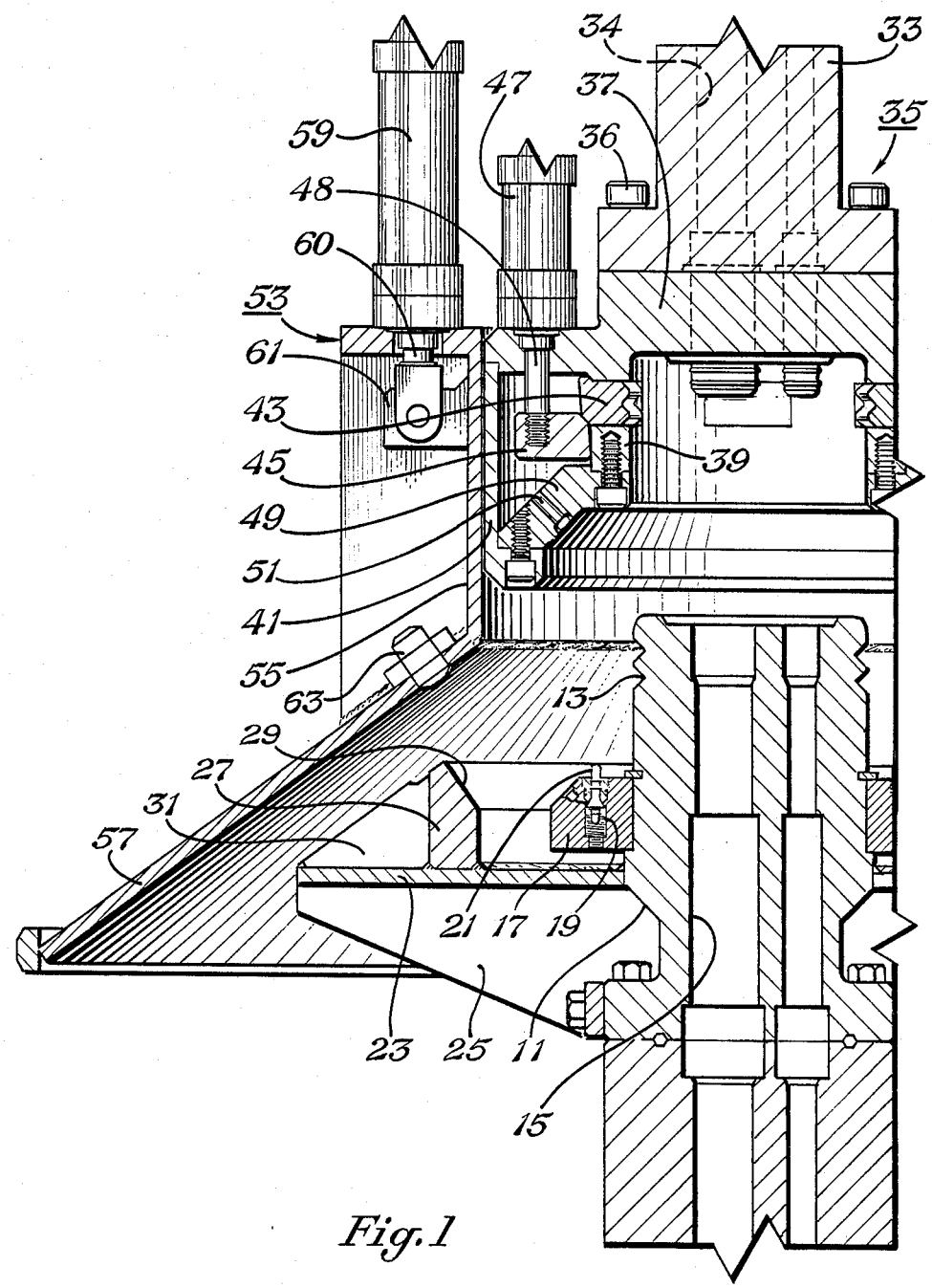
FIG. 1 is a partial vertical sectional view illustrating a re-entry system constructed in accordance with this invention, with the funnel positioned above the mandrel and in an extended position.

Referring to FIG. 1, the subsea well includes an upwardly facing mandrel 11. Mandrel 11 is a tubular member having a plurality of circumferential grooves 3 on its exterior near the upper end. Passages 15 extend through the mandrel 11 for communicating with the well. Normally, a cap (not shown) of some type will be located on top of the mandrel 11 and will be removed when the workover operation is beginning.

A cone seal manifold 17 is mounted to the exterior of mandrel 11. Manifold 17 is an annular member with an upward and outward facing conical exterior. Manifold 17 has a plurality of passages 19 extending through it and spaced around its circumference. Each passage 19 contains a check valve 21. The passages 19 lead to lines (not shown) which lead to various other equipment, such as control valves, on the subsea well. A cone seal manifold 17 of this type is described in more detail in pending U.S. patent application Ser. No. 941,260, filed Mar. 27, 1987, Charles E. Jennings.

A guide frame 23 is mounted to the mandrel 11. Guide frame 23 comprises a flat annular plate that extends outward from the mandrel 11 a considerable distance. Gussets 25 are spaced around the bottom of the guide frame 23 to provide support.

A guide ring 27 is mounted on the upper side of the guide frame 23. Guide ring 27 is a solid annular cylindrical ring. It has a beveled surface 29 on the inner upper edge. The guide ring 27 is located about halfway between the outer edge of the guide frame 23 and the mandrel 11. The diameter of the guide ring 27 is considerably greater than the diameter of the mandrel 11, but considerably less than the outer diameter of the guide frame 23. A plurality of triangular gussets 31 are welded between the outer diameter of the guide frame 23 and the guide ring 27 to provide support to the guide ring 27.

The height of the guide ring 27 is important. The top of the guide ring 27 is lower than the grooves 13 and slightly higher than the cone seal manifold 17. The height and radial position of the guide ring 27 are selected so that a straight line extending from the outer diameter of guide frame 23 to the upper outer edge of the mandrel 11 and to the axis of mandrel 11 would touch the upper edge of the guide ring 27. This straight line is thus tangent to the periphery of the guide frame 23, the top of the guide ring 27 and the rim of mandrel 11. If this straight line is revolved around the axis of the mandrel 11, it generates a conical surface. The alignment of the guide ring 27 with the mandrel 11 and periphery of the guide frame 23 may be considered conical.

A riser 33 is shown being lowered from a floating vessel (not shown). Riser 33 is made up of sections of conduit. Passages 34 extend through the riser 33 for communication with the passages 15 in the mandrel. A mandrel connector 35 is rigidly mounted to the lower end of the riser 33 by bolts 36. The mandrel connector 35 has a top or upper plate 37 which is adapted to land on the top of the mandrel 11. A cylindrical inner sidewall 39 extends downward from the top 37. The inner diameter of the inner sidewall 39 is slightly greater than the outer diameter of the mandrel 11, allowing the inner sidewall 39 to slide down over the mandrel 11. A cylindrical outer sidewall 41 is spaced outward from the inner sidewall 39 and depends from the top 37.

Figure 4:
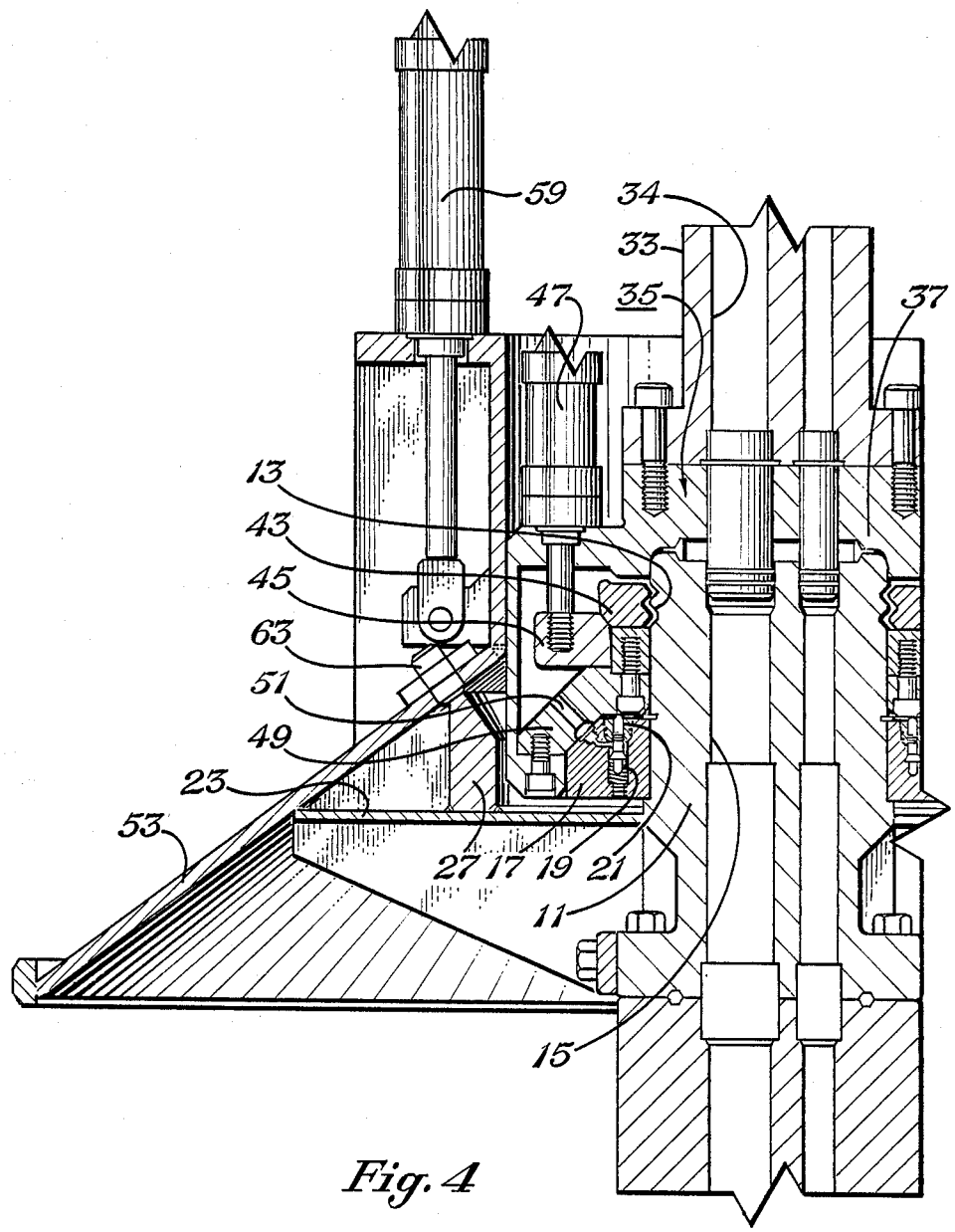
FIG. 4 is a partial vertical sectional view of the system of FIG. 1, with the funnel retracted and with the connector locking means in a retracted position.
Figure 5:
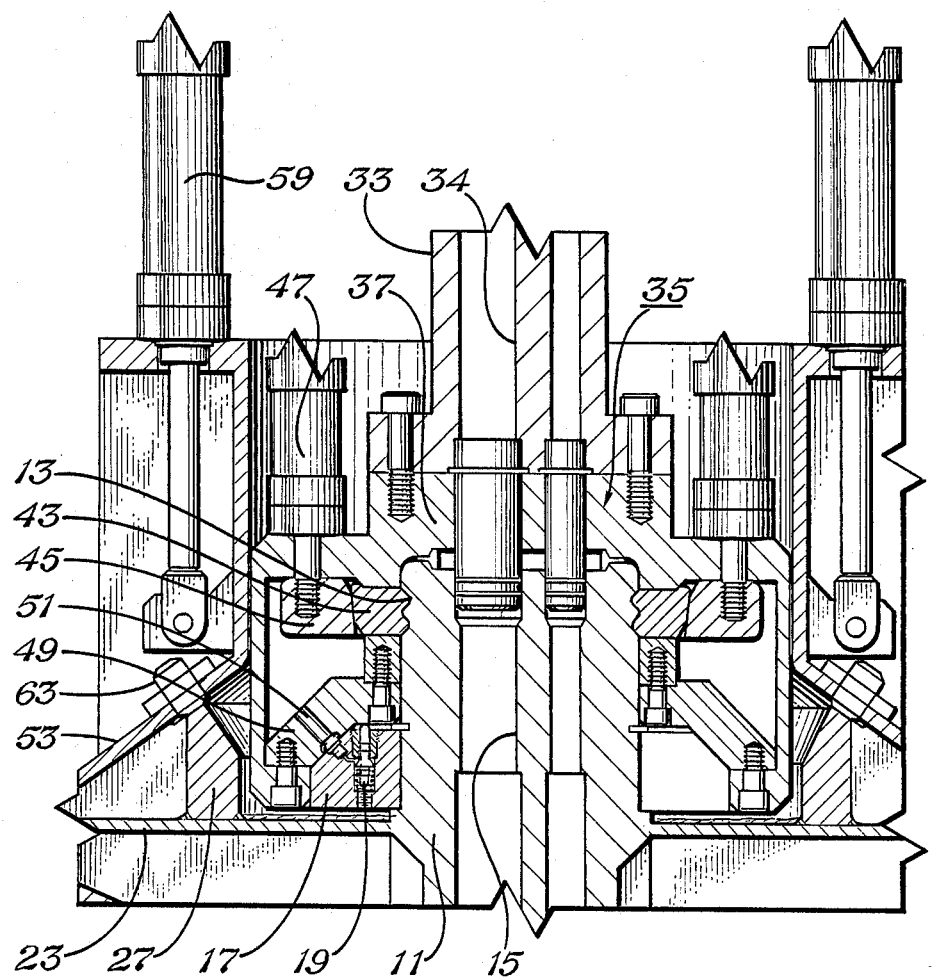
FIG. 5 is a partial sectional view of the system of FIG. 1, showing the funnel retracted and the locking means in a locking position.

A plurality of dogs 43 are carried in windows in the inner sidewall 39. Each dog 43 has grooves on its inner face for engaging the grooves 13. Each dog 43 will move radially between an outward retracted position shown in FIGS. 1, 2 and 4 and an inward locking position shown in FIG. 5.

The dogs 43 are moved inward by means of a cam member 45. Cam member 45 is a ring positioned in the clearance between the inner sidewall 39 and outer sidewall 41. Cam member 45 has an inclined inner face which engages the outer side of each dog 43. A plurality of hydraulic pistons 47 (only one shown) are mounted to the top 37. The shaft 48 of each piston 47 is connected to the cam member 45 for raising the cam member to push the dogs 43 inward.

A manifold connector 49 is rigidly mounted to the mandrel connector 35. The manifold connector 49 is a metal block having a conical inner side that faces downward and inward. A plurality of passages 51 extend through the manifold connector 49. The passages 51 are connected to lines (not shown) which lead to the floating vessel for supplying hydraulic fluid. The passages 51 are positioned to align and register with the passages 19 in the cone seal manifold 17.

An upper guide frame or funnel 53 is carried by the mandrel connector 35. Funnel 53 has an upper cylindrical portion 55. The cylindrical portion 55 is closely and slidingly carried on the outside of the mandrel connector outer sidewall 41. A lower frustoconical portion 57 extends downward from the cylindrical portion 55. The conical portion 57 faces downward. The conical portion 57 is formed at a degree so that it will make a two point contact on the guide frame 23 outer edge and on the guide ring 27. It diverges from the axis of riser 33 at the same angle as the line previously described that extends across the upper edges of the mandrel 11, guide ring 27 and the outer edge of the guide frame 23. Conical portion 57 is considerably larger in diameter than the guide frame 23.

A plurality of hydraulic cylinders 59 (only one shown) are mounted on the upper end of the funnel 53. The shaft 60 of each hydraulic cylinder 59 is connected to a bracket 61. Bracket 61 is secured rigidly to the outer sidewall 41 of the mandrel connector 35. The hydraulic cylinders 59 will move the funnel 53 between an extended position relative to the mandrel connector 35, shown in FIGS. 1 and 2, and a retracted position shown in FIGS. 4 and 5.

A plurality of rollers 63 are rotatably mounted to the conical portion 57 of funnel 53. The rollers 63 extend through holes in the conical portion 57. The rollers 63 are positioned in a fixed position relative to funnel 53 to contact the upper edge of the guide ring 27. The rollers 63 allow the funnel 53 to be rotated relative to the guide ring 27.

Referring to FIG. 3, a pin 65 is carried by the funnel 53. The pin 65 is not shown in FIGS. 1, 2, 4 and 5. Pin 65 is mounted to the cylindrical portion 55 by means of a bracket 67. A spring 69 urges the pin 65 downward through a hole formed in the conical portion 57 of funnel 53. A slot 71 is formed in the upper edge of the guide ring 27. As the funnel 53 is rotated, the pin 71 will slide on the upper edge of the guide ring 27 until reaching the slot 71. At that point, the pin 65 will enter the slot 71 and prevent further rotation of the funnel 53.

In operation, when the subsea well needs workover operations, the upper protector cap (not shown) will be removed by various means. The riser 33 will be lowered from the vessel (not shown) to a point above the mandrel 11. Because there will be no guide lines to assure precise alignment, the funnel 53 may be considerably out of alignment with the mandrel 11 initially. Current and wave movement make precise alignment difficult. Television cameras located adjacent the funnel 53 will assist in aligning the funnel 53. The riser 33 will be rotated until the funnel 53 is oriented within about 90 degrees of proper orientation, as observed at the surface by the television cameras.

The riser 33 is then lowered. The funnel 53 may contact the upper edge of the mandrel 11 prior to touching the guide frame 23. If so, it will slide laterally and downward as the riser 33 is lowered. The conical portion 57 will touch the upper edge of the guide ring 27 and eventually slide into full engagement as shown in FIG. 2. The conical alignment of the tops of the mandrel 11, guide ring 27 and outer edge of the guide frame 23, assist in guiding the funnel 53 onto the mandrel 11. At this point, the riser 33 is coaxial with the mandrel 11. The rollers 63 will be contacting the guide ring 27. The funnel conical portion 57 will be touching the outer edge of the guide frame 23. The funnel 53 will still be in the extended position relative to the mandrel connector 35 as shown in FIG. 2. The mandrel connector 35 will be spaced above the mandrel 11.

Then, the riser 33 will be rotated, and along with it the mandrel connector 35 and funnel 53. The rollers 63 will roll on the guide ring 27. The pin 65 (FIG. 3) will slide on the upper edge of the guide ring 27. When the pin 65 reaches the slot 71, it will snap into the slot 71, preventing further rotation. The slot 71 is positioned so that when engaged by pin 65, the mandrel connector 35 will be properly oriented relative to the mandrel 11. The passages in the mandrel connector 35 will be aligned with the passages 15 in the mandrel 11. The passages 51 in the manifold connector 49 will be aligned with the passages 19 in the cone seal manifold 17.

Then, the funnel 53 is retracted relative to riser 33. During the retraction movement, funnel 53 does not actually move. Rather, the hydraulic cylinders 59 stroke downward, allowing the riser 33 and mandrel connector 35 to move downward. The mandrel connector 35 will land on top of the mandrel 11. This causes sealing communication between the passages 34 and 15. At the same time, the manifold connector passages 51 will register with the cone seal manifold passages 19. As shown in FIG. 3, the manifold connector 49 will be in contact with the cone seal manifold 17. The check valve 21 is depressed by the manifold connector 49. This redirects the fluid passages so that hydraulic fluid from the floating vessel will communicate with the controls on the subsea well.

Next, hydraulic fluid pressure is supplied to the hydraulic cylinders 47. This causes the shafts 48 to retract from the position shown in FIG. 4 to that shown in FIG. 5. As they retract, the cam member 45 pushes the dogs 43 inward to tightly engage the grooves 13. This also pulls the manifold connector 49 into tight engagement with the cone seal manifold 17. Workover operations may then take place.

After the workover operations are completed, the funnel 53 is removed from the mandrel 11. Hydraulic fluid pressure is supplied to the hydraulic cylinders 47 to move the cam member 45 downward. This frees the dogs 43 for retraction. Hydraulic fluid pressure is supplied to the hydraulic cylinders 59. This moves the mandrel connector 35 upward relative to the funnel 53. The riser 33 may then be lifted from the mandrel 11.

The invention has significant advantages. Utilizing a downward facing funnel on the riser avoids the need for large structural funnels mounted to the subsea wells. The mandrel height is no higher than that required at a normal Christmas tree. The orientation takes place only after the funnel has landed on the guide ring, simplifying orientation. Hydraulic controls are made up simultaneously with the locking of the mandrel connector to the mandrel.

While the invention has been shown in only one of its forms, it should be apparent to those skilled in the art that it is not so limited, but is susceptible to various changes without departing from the scope of the invention.

We claim:

1. An apparatus for connecting a riser extending from a floating vessel to a subsea well assembly of the type having an upward extending tubular mandrel having a plurality of circular grooves on its exterior, comprising in combination:

a guide frame assembly mounted to the mandrel a selected distance below the top of the mandrel;
   a mandrel connector mounted to the lower end of the riser;
   a plurality of dogs carried by the mandrel connector for radial movement between an outer retracted position and an inner locking position in engagement with the grooves on the mandrel;
   cam means hydraulically actuated and carried by the mandrel connector for moving the dogs between the retracted and locking positions;
   a downward facing guide funnel carried by the riser for insertion over the mandrel into engagement with the guide frame assembly, the guide frame assembly having an annular surface adapted to be contacted by the guide funnel, the funnel diverging at substantially the same angle as the angle of a line extending from the top of the mandrel to the annular surface;
   the mandrel protruding upward from all portions of the guide frame assembly a distance sufficient to receive the mandrel connector around the mandrel; and
   means carried by the funnel and material connector for moving the funnel from a lower extended position relative to the riser and mandrel connector as the funnel is being lowered into engagement with the guide ring, to an upper retracted position once the funnel has landed on the guide frame assembly, causing the riser and mandrel connector to move downward relative to the funnel onto the mandrel and positioning the dogs adjacent the grooves, enabling the cam means to move the dogs into the locking position.

2. An apparatus for connecting a riser extending from a floating vessel to a subsea well assembly of the type having an upward extending tubular mandrel, comprising in combination:

a guide frame mounted to the mandrel a selected distance below the top of the mandrel and having a generally circular periphery;
   a guide ring mounted to the guide frame, encircling the mandrel and extending upward from the guide frame to a point that is a selected distance below the top of the mandrel, defining an annular clearance between the mandrel and the guide ring;
   a mandrel connector mounted to the lower end of the riser for landing on the top of the mandrel to communicate the interior of the mandrel with the interior of the riser;
   connector means carried by the mandrel to secure the mandrel connector to the mandrel;
   a downward facing guide funnel carried by the riser and having a frusto-conical lower side for insertion over the mandrel into engagement with the guide ring and the periphery of the guide frame, the funnel diverging at substantially the same angle as the angle of a line extending from the top of the mandrel to the upper edge of the guide ring; and
   means carried by the first funnel and the mandrel connector for moving the funnel from a lower extended position relative to the riser and mandrel connector as the funnel is being lowered into engagement with the guide ring to an upper retracted position once the funnel has landed on the guide ring, causing the riser and mandrel connector to move downward relative to the funnel onto the mandrel and positioning the connector means in the annular clearance around the mandrel, to allow the connector means to operate to secure the mandrel connector to the mandrel.

3. An apparatus for connecting a riser extending from a floating vessel to a subsea well assembly of the type having an upward extending tubular mandrel with a plurality of grooves on its exterior, comprising in combination:
- a guide frame mounted to the mandrel a selected distance below the top of the mandrel;
- a guide ring mounted to the guide frame, encircling the mandrel a selected distance outward from the mandrel to define an annular clearance between the mandrel and guide ring, the guide ring extending upward from the guide frame to a point that is a selected distance below the top of the mandrel;
- an annular hydraulic manifold mounted to the mandrel in the clearance between the guide ring and mandrel, having a plurality of hydraulic passages for communicating hydraulic fluid delivered from the floating vessel to equipment on the subsea well;
- a mandrel connector mounted to the lower end of the riser for landing on the to of the mandrel to communicate the interior of the mandrel with the interior of the riser;
- a plurality of dogs carried by the mandrel connector for radial movement between an outer retracted position and an inner locking position in engagement with the grooves on the mandrel;
- cam means hydraulically actuated and carried by the mandrel connector for moving the dogs between the retracted and locking positions;
- an annular hydraulic manifold connector mounted to the mandrel connector, having a plurality of hydraulic passages for connection to a supply of hydraulic fluid on the vessel, the manifold connector being positioned to engage the manifold;
- a downward facing guide funnel carried by the riser for insertion over the mandrel into engagement with the guide ring; and
- means carried by the funnel and mandrel connector for moving the riser and mandrel connector downward relative to the funnel onto the mandrel and the manifold connector onto the manifold after the funnel has landed on the guide ring and the mandrel connector has been rotated to the proper orientation, positioning the dogs adjacent the grooves, to allow the cam means to move the dogs into the locking position.

4. An apparatus for connecting a riser extending from a floating vessel to a subsea well assembly of the type having an upward extending tubular mandrel having a plurality of circular grooves on its exterior, comprising in combination:
- a guide frame mounted to the mandrel a selected distance below the top of the mandrel;
- a guide ring mounted to the guide frame, encircling the mandrel and extending upward from the guide frame to a point that is a selected distance below the grooves of the mandrel;
- a slot formed in the guide ring;
- an annular hydraulic control manifold mounted to the mandrel in the clearance between the guide ring and mandrel, having a plurality of hydraulic passages for communicating hydraulic fluid to equipment on the subsea well;
- a mandrel connector mounted to the lower end of the riser;
- an annular hydraulic control manifold connector mounted to the mandrel connector, having a plurality of hydraulic passages for connection to a supply of hydraulic fluid on the vessel, the manifold connector being positioned to engage the manifold with the hydraulic passages of each in alignment with the other;
- a plurality of dogs carried by the mandrel connector for radial movement between an outer retracted position and an inner locking position in engagement with the grooves on the mandrel;
- cam means hydraulically actuated and carried by the mandrel connector for moving the dogs between the retracted and locking positions;
- a downward facing guide funnel carried by the riser for insertion over the mandrel into engagement with the guide ring;
- roller means on the guide funnel for rolling engagement with the guide ring, for enabling the funnel to be rotated along with the riser relative to the mandrel to orient the mandrel connector;
- means on the funnel for engaging the slot in the guide ring for stopping rotation of the funnel relative to the mandrel once proper orientation has been achieved;
- means carried by the funnel and the mandrel connector for hydraulically moving the riser and mandrel connector downward relative to the funnel onto the mandrel and the manifold connector onto the manifold after the funnel has landed on the guide ring and the mandrel connector has been rotated to the proper orientation, positioning the dogs adjacent the grooves, enabling the cam means to move the dogs into the locking position.

* * * * *

UNITED STATES PATENT AND TRADEMARK OFFICE
CERTIFICATE OF CORRECTION

PATENT NO. : 4,823,878

DATED : April 25, 1989

INVENTOR(S) : Norman Brammer et al

It is certified that error appears in the above-identified patent and that said Letters Patent is hereby corrected as shown below:

Column 6, line 20, "material" should read -- mandrel --.

Signed and Sealed this

Fifth Day of December, 1989

Attest:

JEFFREY M. SAMUELS

Attesting Officer    Acting Commissioner of Patents and Trademarks